(12) United States Patent
Shirai

(10) Patent No.: US 8,493,587 B2
(45) Date of Patent: Jul. 23, 2013

(54) PRINTING DEVICE WITH JOB CANCELLATION FUNCTION

(75) Inventor: Takaaki Shirai, Okazaki (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 364 days.

(21) Appl. No.: 12/820,182

(22) Filed: Jun. 22, 2010

(65) Prior Publication Data

US 2011/0075202 A1    Mar. 31, 2011

(30) Foreign Application Priority Data

Sep. 29, 2009   (JP) ................. 2009-225005

(51) Int. Cl.
*G06K 15/00*   (2006.01)
*G06F 3/12*    (2006.01)
*G06F 9/46*    (2006.01)
*G06F 3/00*    (2006.01)
*H04N 1/00*    (2006.01)

(52) U.S. Cl.
USPC ........ 358/1.14; 358/1.15; 358/1.16; 358/437; 718/102; 710/39

(58) Field of Classification Search
None
See application file for complete search history.

(56) References Cited

U.S. PATENT DOCUMENTS

| 2003/0084086 | A1* | 5/2003 | Simpson et al. | 709/102 |
| 2004/0041873 | A1* | 3/2004 | Iwasaki et al. | 347/23 |
| 2005/0002065 | A1  | 1/2005 | Kotaka et al. | |
| 2007/0070386 | A1* | 3/2007 | Yamada | 358/1.14 |
| 2008/0013123 | A1  | 1/2008 | Yoshioka | |

FOREIGN PATENT DOCUMENTS

| JP | 11-003004 | 1/1999 |
| JP | 2004-320717 | 11/2004 |
| JP | 2005-231269 | 9/2005 |
| JP | 2006-224522 | 8/2006 |
| JP | 2006-256075 | 9/2006 |
| JP | 2008-018622 | 1/2008 |

OTHER PUBLICATIONS

Extended EP Search Report dtd Jun. 20, 2012, JP Appln. 10006372.6-1245.
EP Communication mailed OA Mar. 14, 2013, EP App 10006372.

* cited by examiner

*Primary Examiner* — Thomas Lett
(74) *Attorney, Agent, or Firm* — Banner & Witcoff, Ltd.

(57) ABSTRACT

A printing device includes a control device configured to receive a cancellation request instruction, receive a confirmation instruction for confirming each printing job to be cancelled or not, set the printing job in the queue to be in a stop condition if receiving the cancellation request instruction, and delete from the queue the printing job if receiving the confirmation instruction for the printing job. The control device further determines whether the job receiving device receives another new printing job during an instruction waiting period from a time when receiving confirmation instruction, and controls the printing device to print the other new printing job prior to printing of the printing job registered in the queue, if the job receiving device receives the other new printing job.

15 Claims, 10 Drawing Sheets

FIG.7

| JOB:4 | PRINT (2page) | (TEMPORALLY STOPPED) |
| JOB:3 | PRINT (3page) | (TEMPORALLY STOPPED) |
| JOB:2 | COPY (10page) | (TEMPORALLY STOPPED) |
| JOB:1 | COPY (5page) | (TEMPORALLY STOPPED) |
| JOB:0 | PRINT (20page) | (PRINTING EXECUTION) |

PRINTING DEVICE WITH JOB CANCELLATION FUNCTION

CROSS REFERENCE TO RELATED APPLICATION

The present application claims priority from Japanese Patent Application No. 2009-225005 filed on Sep. 29, 2009. The entire content of this priority application is incorporated herein by reference.

TECHNICAL FIELD

The present disclosure relates to a printing device, and particularly relates to a printing device having a function for canceling a printing job by a user's instruction.

BACKGROUND

It has been known that the printing device having a function for canceling a printing job by a user's instruction. In such printing devices, for example, if a cancel key is pressed by a user, processing of all printing jobs including waiting jobs registered in a queue is stopped. Then, a screen for selecting a job that is to be cancelled is displayed on a display. If a job that is to be cancelled is selected by a user, the job is deleted from the queue and processing of other jobs remaining in the queue is restarted.

If the cancel key is pressed during a printing operation of the printing job, processing of all printing jobs is stopped until the job that is to be cancelled is confirmed. Therefore, printing of unnecessary printing job is not continued and printing of unnecessary printing job is not started.

However, in the above-described printing device, processing of all printing jobs is stopped during a period from a time when a user presses the cancel key to a time when the job that is to be cancelled is confirmed. This delays execution of the processing.

SUMMARY

A printing device according to an aspect of the present invention includes a job receiving portion, a printing portion, a control portion and an instruction receiving portion. The job receiving portion is configured to receive a printing instruction of a printing job. The printing portion is configured to print the printing job. The control portion is configured to register the printing job whose printing instruction is received by the job receiving portion in a queue and control the printing portion to print the printing job registered in the queue sequentially. The instruction receiving portion is configured to receive a request instruction for requesting cancellation of the printing job registered in the queue and a confirmation instruction for confirming each printing job to be one that is to be cancelled or one that is not to be cancelled. Specifically, when the request instruction is received by the instruction receiving portion, the control portion sets the printing job registered in the queue to be in a stop condition, and then the control portion deletes from the queue the printing job that is in the stop condition and confirmed to be one that is to be cancelled by the confirmation instruction. If a printing instruction of a new printing job is received by the job receiving portion during an instruction waiting period from a time when the request instruction is received by the instruction receiving portion to a time when the confirmation instruction is received by the instruction receiving portion, printing of the new printing job is started by the printing portion.

A printing device according to another aspect of the present invention includes a job receiving portion, a printing portion, a control portion and an instruction receiving portion. The job receiving portion is configured to receive a printing instruction of a printing job of a plurality kinds including a facsimile printing job for printing facsimile data and a non-facsimile printing job for printing data other than facsimile data. The printing portion is configured to print the printing job. The control portion is configured to register the printing job whose printing instruction is received by the job receiving portion in a queue and control the printing portion to print the printing job registered in the queue sequentially. The instruction receiving portion is configured to receive a request instruction for requesting cancellation of the printing job registered in the queue and a confirmation instruction for confirming each printing job to be one that is to be cancelled or one that is not to be cancelled. Specifically, when the request instruction is received by the instruction receiving portion, the control portion sets the printing job other than the facsimile printing job registered in the queue to be in a stop condition, and then the control portion deletes from the queue the printing job that is in the stop condition and confirmed to be one that is to be cancelled by the confirmation instruction. If a printing instruction of a new printing job is received by the job receiving portion during an instruction waiting period from a time when the request instruction is received by the instruction receiving portion to a time when the confirmation instruction is received by the instruction receiving portion, and if no facsimile printing job is registered in the queue, printing of the new printing job is started by the printing portion.

BRIEF DESCRIPTION OF THE DRAWINGS

Illustrative aspects in accordance with the present invention will be described in detail with reference to the following drawings wherein:

FIG. 7 is a content example in a printing queue;

DETAILED DESCRIPTION

<Illustrative Aspect>

An illustrative aspect of a multifunction device will be hereinafter explained with reference to FIGS. 1 to 7

The illustrative aspect shows an example where the present invention is applied to a multifunction device 10 (one example of a printing device) having functions of a printer, a copying device, a scanner and a facsimile device.

(General Construction of Multifunction Device)

Figure 1:
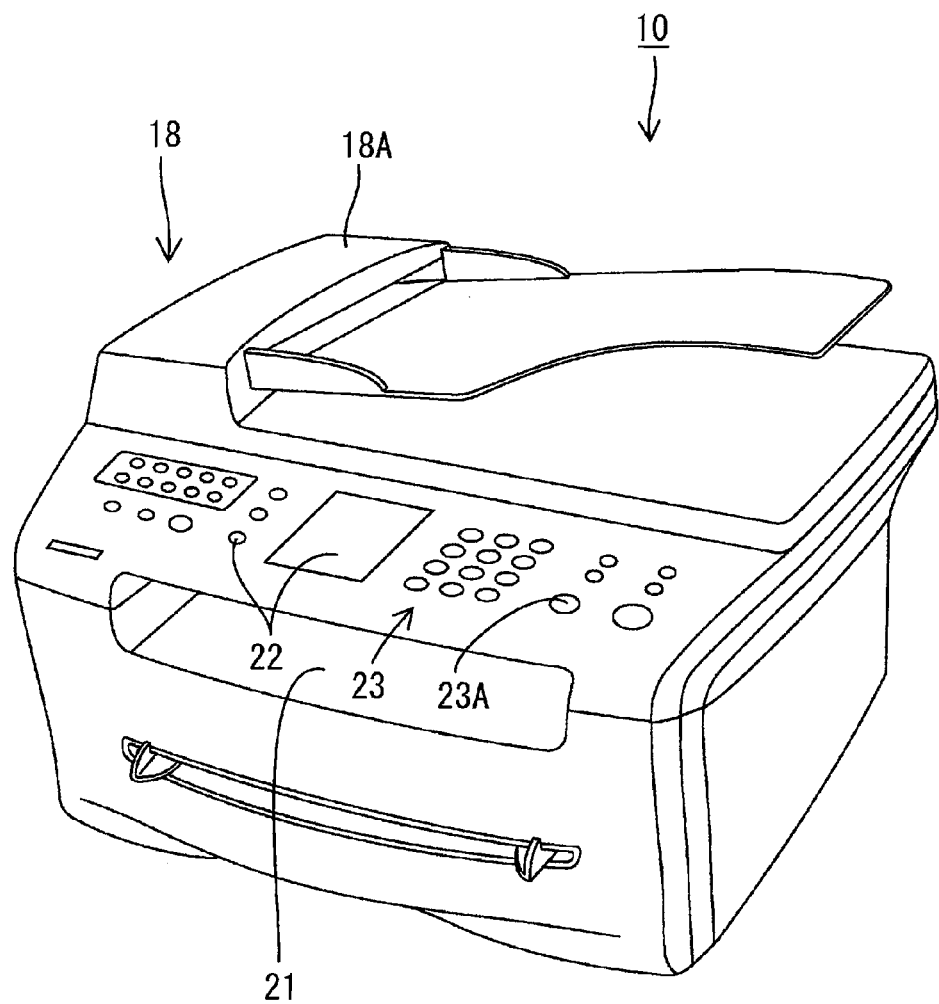
FIG. 1 is a perspective view of an outer appearance of a multifunction device according to one aspect of the present invention.
Figure 2:
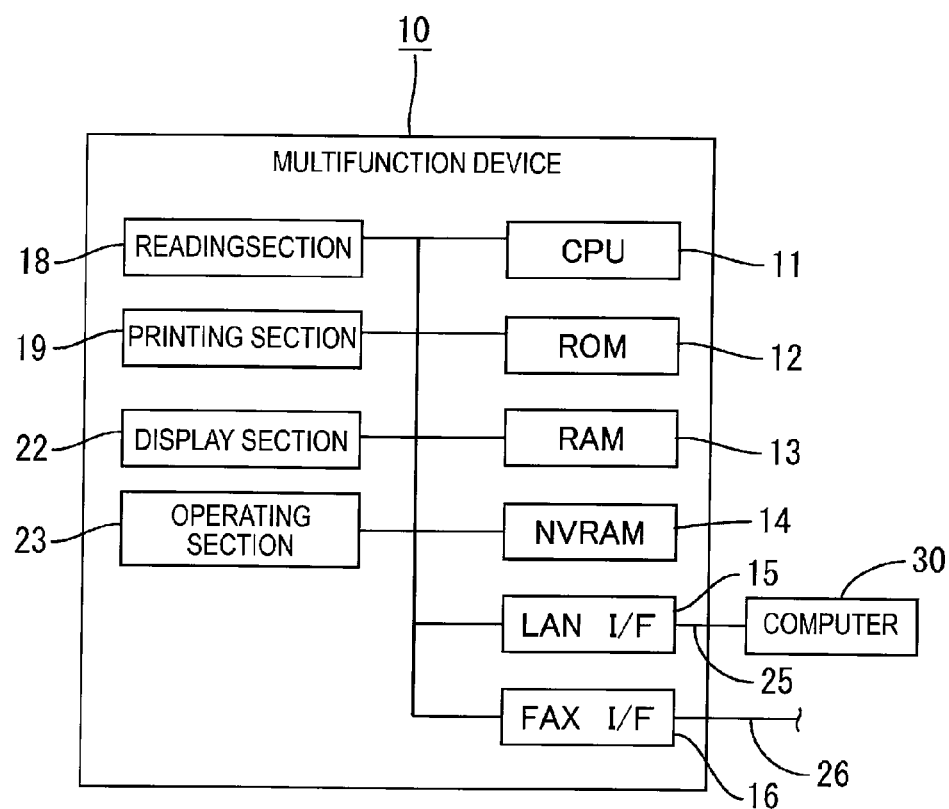
FIG. 2 is a block diagram schematically showing the electrical configuration of the multifunction device.

FIG. 1 is a perspective view of an outer appearance of the multifunction device 10, and FIG. 2 is a block diagram schematically showing the electrical configuration of the multifunction device 10.

The multifunction device 10 has a CPU 11, a ROM 12, a RAM 13, a NVRAM (nonvolatile memory) 14, a network interface 15, and a facsimile interface 16. The ROM 12 stores programs for executing various operations of the multifunction device 10 including a job receiving process, a printing process, a cancellation process and other processes that will be described later. The CPU 11 (one example of a control portion) controls each section according to a program read from the ROM 12 with storing processing results in the RAM 13 or the NVRAM 14.

The network interface 15 (one example of a job receiving portion and an instruction receiving portion) is connected to an external computer 30 or other devices via a communication line 25 such as a LAN so as to achieve mutual data transmission. The facsimile interface 16 is connected to a telephone line 26 so as to achieve facsimile data transmission with external facsimile devices via the facsimile interface 16.

The multifunction device 10 has a reading section 18 and a printing section 19. The reading section 18 comprises a manuscript feeding device 18A. The reading section 18 sequentially reads the manuscript set on the manuscript feeding device 18A and outputs image data. The printing section 19 (one example of a printing portion) prints an image on a paper (printing medium, not shown) based on printing data and discharges the printed paper to a discharge tray 21.

The multifunction device 10 further comprises a display section 22 and an operating section 23. The display section 22 comprises a display and an instruction lamp and displays various setting screens and operating conditions of the device. The operating section 23 (one example of a job receiving portion and an instruction receiving portion) comprises a plurality of buttons. A user inputs various instructions from the operating section 23. The operating section 23 comprises a cancel key 23A that is capable of inputting an instruction for requesting cancellation (deletion) of a job.

(Operation of Multifunction Device)

The multifunction device 10 executes jobs of copying, PC printing, facsimile printing and other operations as a printing job that is executed by the printing process. The CPU 11 executes the job receiving process, the printing process and the cancellation process (described below) in parallel with multitasking. The job receiving process, the printing process and the cancellation process are related to the execution of the printing jobs.

(Operation of Job Receiving Process)

Figure 3:
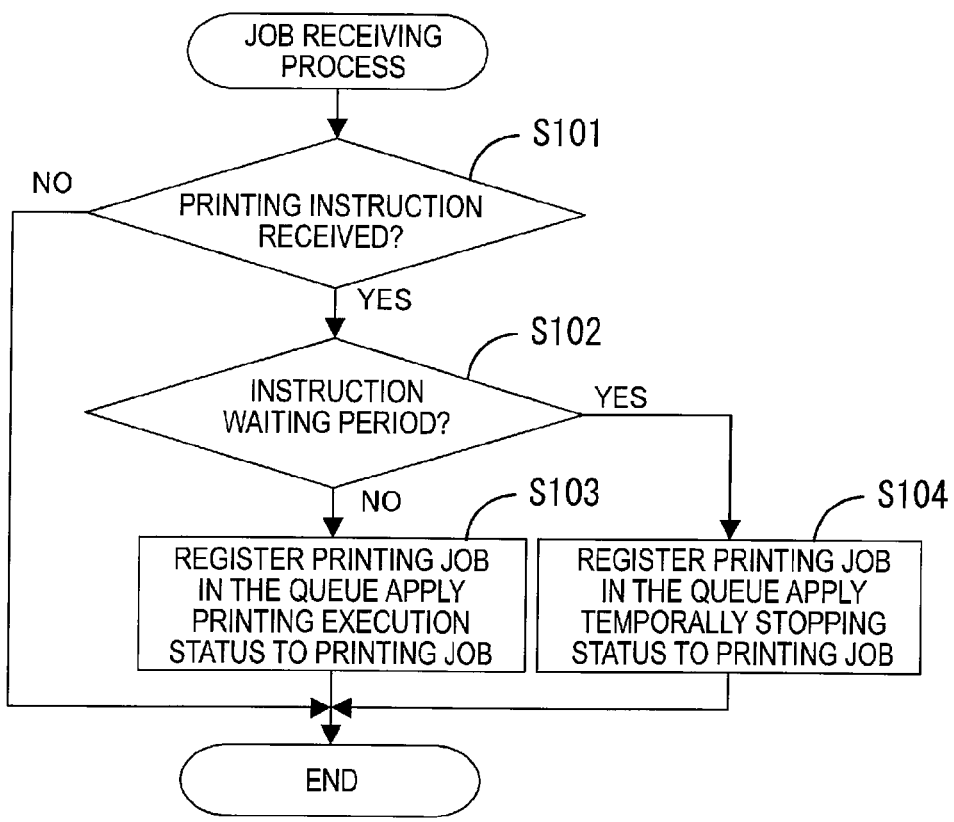
FIG. 3 is a flowchart of a job receiving process.

FIG. 3 is a flowchart of the job receiving process.

The job receiving process is a process for receiving a printing instruction (execution request) of a printing job. The job receiving process is executed regularly in a condition that a power source of the multifunction device 10 is on.

When starting the job receiving process shown in FIG. 3, the CPU 11 determines whether a printing instruction is received (S101). For example, an execution instruction of copying input from the operating section 23 by a user, an execution instruction of PC printing sent from the computer 30 and received via the network interface 15, and an incoming request received from a facsimile device via the facsimile interface 16 are considered to be the printing instruction. If the CPU 11 does not receive the printing instruction (S101: No), the job receiving process is terminated.

If the CPU 11 receives the printing instruction (S101:Yes), the CPU 11 determines whether the multifunction device 10 is in an instruction waiting period (S102). The instruction waiting period is a period while the multifunction device 10 is waiting for an instruction input by a user in the cancellation process (described later). If the CPU 11 determines that the multifunction device 10 is not in the instruction waiting period (S102:No), the printing job corresponding to the contents of the printing instruction is registered in a printing queue (S103).

The printing queue is a data configuration for defining an execution order of the printing job. A plurality of printing jobs can be registered in the printing queue. When a new printing job is registered in the printing queue and there is a printing job that has been already registered in the printing queue, the new printing job is registered at an end of the registered printing job. One of a printing execution status and a temporally stopping status is applied to each printing job registered in the printing queue. This status is used for controlling execution of the printing operation for every printing job in the printing process described next.

If the multifunction device 10 is not in the instruction waiting period, the CPU 11 applies the printing execution status to the printing job that is to be registered in the printing queue. If the multifunction device 10 is in the instruction waiting period (S102:Yes), the CPU 11 registers the printing job corresponding to the printing instruction in the printing queue and applies the temporally stopping status to the printing job (S104).

(Printing Process)

Figure 4:
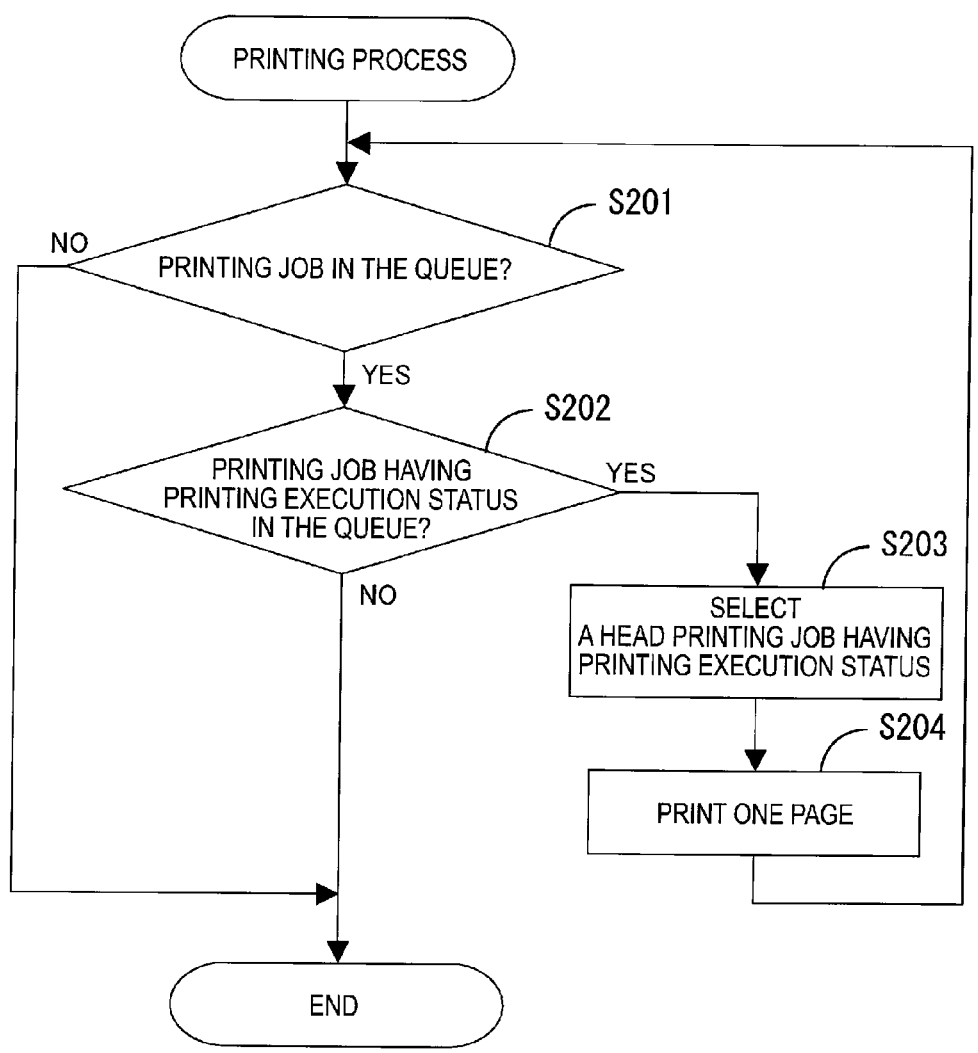
FIG. 4 is a flowchart of a printing process.

FIG. 4 is a flowchart of the printing process. The printing process is a process for printing the printing job registered in the printing queue and executed regularly in a waiting condition.

If the printing process shown in FIG. 4 is started, the CPU 11 determines whether a printing job is in the printing queue (S201). If no printing job is in the printing queue (S201:No), the printing process is terminated. If a printing job is in the printing queue (S201:Yes), the CPU 11 determines whether each printing job in the printing queue has the printing execution status (S202). If there is no printing job having the printing execution status in the printing queue (S202:no), the printing process is terminated.

If there are printing jobs having the printing execution status (S202:Yes) in the printing queue, a head one of the printing jobs is selected as one that is to be printed (S203). Data of the selected printing job corresponding to one page is printed by the printing section 19 (S204) and the process returns to S201. If there is no printing job having the printing execution status in the printing queue (S202:No), the printing process is terminated.

In the printing process, after a printing job comprising a plurality of pages is selected as the one that is to be printed and if the selected printing job is not deleted from the printing queue and the status of the selected printing job is not changed and the order in the printing queue is not changed, the processes of S201 to S204 are repeated for the number of times corresponding to the number of pages such that all the pages are printed. Before completion of the printing of the selected printing job and if the selected printing job is deleted from the printing queue, or if the status of the selected printing job is changed to the temporally stopping status, or if the selected printing job is not the head one of the printing jobs having the printing execution status, the printing operation of the selected printing job is interrupted or cancelled. After all the pages of the printing job are printed, the printing job is deleted from the printing queue.

(Cancellation Process)

Figure 5:
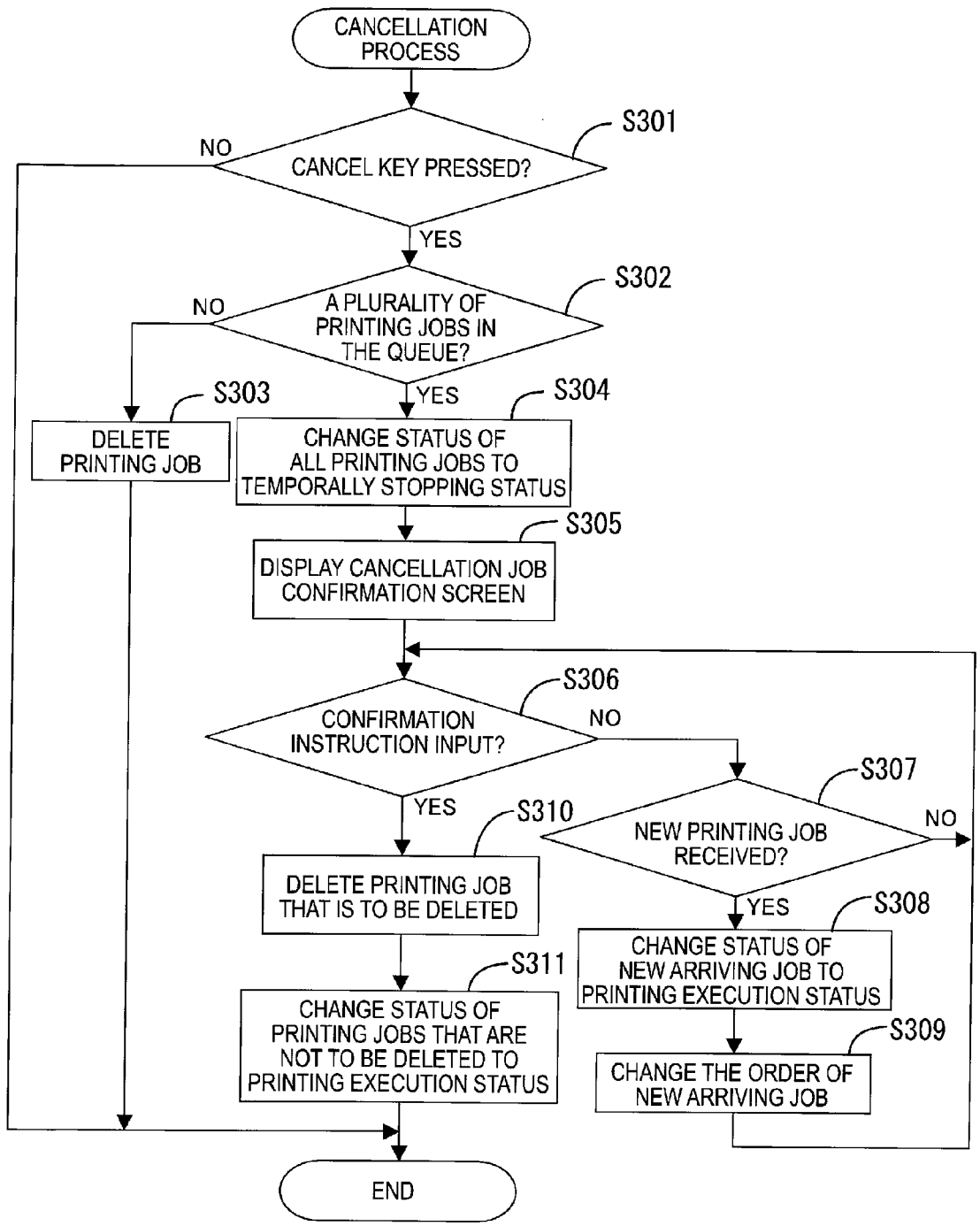
FIG. 5 is a flowchart of a cancellation process.

FIG. 5 is a flowchart of the cancellation process. The cancellation process cancels (deletes) the printing job that is registered in the printing queue. The cancellation process is executed when a printing job is in the printing queue.

When the cancellation process shown in FIG. 5 is started, the CPU 11 determines whether the cancel key 23A is pressed or not (S301). If the CPU 11 determines that the cancel key 23A is not pressed (S301:No), the cancellation process is terminated. If the CPU 11 determines that the cancel key 23A is pressed (S301:Yes), it is determined whether a plurality of printing jobs are in the printing queue (S302).

If the CPU determines that only one printing job is in the printing queue (S302:No), the printing job is deleted from the printing queue (S303), and the cancellation process is terminated. In other words, if only one printing job is registered in the printing queue, there is a great possibility that the printing job is the one that is to be cancelled by a user. Therefore, the printing job is deleted from the printing queue as the one that is to be deleted. If the printing job that is deleted is being printed in the printing process, the printing operation of the printing job is stopped.

If the CPU 11 determines that a plurality of printing jobs are in the printing queue (S302:Yes), the CPU 11 changes the status of all the printing jobs to the temporally stopping status (S304). Accordingly, the running printing operation of the printing job is stopped and all the printing jobs are in a stop condition in the printing process.

Figure 6:
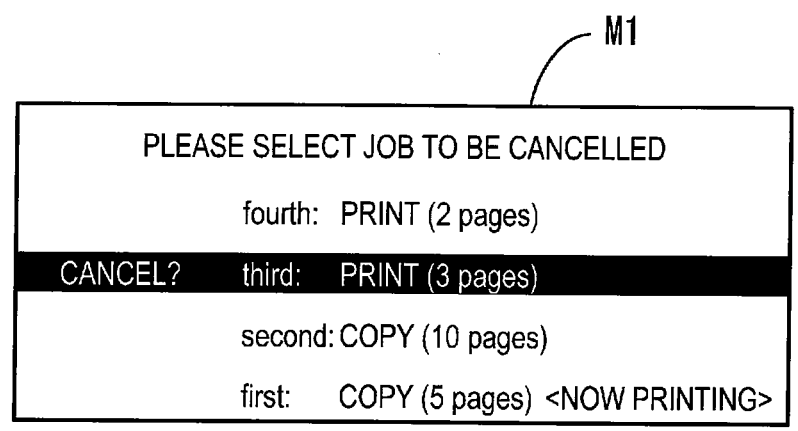
FIG. 6 is a diagram showing a display for confirmation of a cancellation job.

Next, the CPU 11 displays a cancellation job confirmation screen M1 as shown in FIG. 6 on the display section 22 (S305). Information of each printing job that is registered in the printing queue (a kind of a printing job, the number of printing pages and so on) is displayed on the cancellation job confirmation screen M1. A user selects one or some of the printing jobs that are displayed on the screen M1 with using the operating section 23 so as to input a confirmation instruction for confirming the printing job that is to be deleted. The printing jobs other than the printing job that is confirmed as the one that is to be deleted are confirmed as ones that are not to be deleted.

After displaying the cancellation job confirmation screen M1, the CPU 11 determines whether the confirmation instruction is input (S306). If the CPU 11 determines that the confirmation instruction is not input (S306:No), it is determined whether a new printing job (new arriving job) is received in the job receiving process (S307). If no new arriving job is received (S307:No), the process returns to S306.

In other words, the CPU 11 repeatedly determines whether a new arriving job is received in the job receiving process until the confirmation instruction is input after the status of all the printing jobs is changed to the temporally stopping status (instruction waiting period). If a new arriving job is received (S307:Yes), the status of the new arriving job to which the temporally stopping status has been applied in S104 in the job receiving process is changed to the printing execution status (S308). The order of the new arriving job is changed (S309) and the process returns to S306.

The order of the new arriving job is set to be higher than that of the printing jobs that is set to be in the stop condition in S304. Therefore, if all the printing jobs other than the new arriving job are the ones that are set to be in the stop condition in S304, the order of the new arriving job becomes head. FIG. 7 shows an example of the printing queue in such a case. A number is applied to each of the registered printing jobs sequentially from JOB:0 to JOB:4 and JOB:0 is head. In FIG. 7, the printing jobs JOB:1 to JOB:4 are the ones whose status is changed to the temporally stopping status in S304, and JOB:0 is the new arriving job whose status is changed to the printing execution status in S308.

When a new arriving job is added in the printing queue, printing of the new arriving job that is a head one of the printing jobs having the printing execution status is started in the printing process. If there has been already another new arriving job before one new arriving job is registered in the printing queue, the order of the one new arriving job is next to the other new arriving job. Therefore, in such a case, after printing of the other new arriving job is completed, printing of the one new arriving job is started.

If the confirmation instruction is input by a user (S306: Yes), the CPU 11 deletes the printing job that is confirmed as the one to be deleted from the printing queue (S310). The status of the printing jobs that are confirmed as the ones that are not to be deleted is changed to the printing execution status (S311) and the cancellation process is terminated. Accordingly, if no new arriving job is received during the instruction waiting period, printing of the printing jobs that are confirmed as the ones that are not to be deleted is started. If any new arriving jobs are received during the instruction waiting period, the printing jobs that are confirmed as the ones that are not to be deleted is started after printing of the new arriving job.

Effects Of Illustrative Aspect

According to the illustrative aspect, when a request instruction for requesting cancellation of a printing job is received, all the printing jobs registered in the printing queue are set to be in the stop condition. In this condition, if a printing instruction of a new arriving job (new printing job) is received during the instruction waiting period until the printing job that is to be deleted is confirmed by the confirmation instruction, printing of the new arriving job is started before the printing operation of the printing jobs that are in the stop condition. Accordingly, printing of another printing job is executed while the device 10 waits for the confirmation instruction by a user. This suppresses delay of execution of the processing.

If printing of the new arriving job is being executed when the confirmation instruction is received, printing of the printing jobs that are not to be deleted is executed after printing of the new arriving job is completed. This solves problems that are caused when printing of the new arriving job is interrupted (mixing of printed papers of the new arriving job and printed papers of another printing job).

<Additional Illustrative Aspect>

Figure 8:
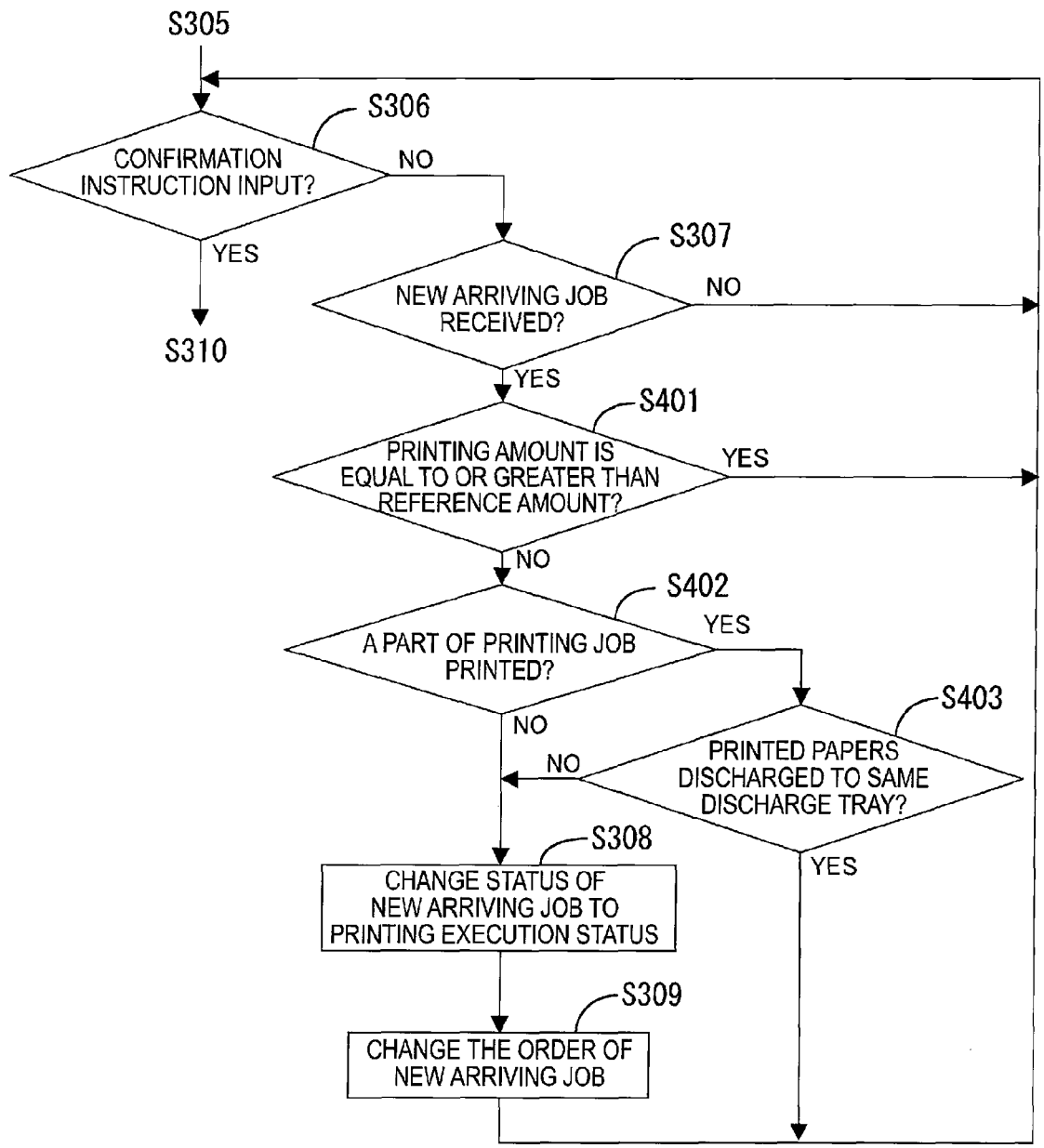
FIG. 8 is a flowchart showing a part of a cancellation process according to another illustrative aspect.

Next, another illustrative aspect of the multifunction device will be explained with reference to FIG. 8. FIG. 8 is a flowchart showing a part of the cancellation process.

The electrical construction and the mechanical construction of the multifunction device 10 are substantially the same as those of the above illustrative aspect. Therefore, the same symbols are applied to the components the same as those of the above illustrative aspect and explanation thereof is omitted. The multifunction device 10 of another illustrative aspect has a plurality of discharge trays 21 (one example of the discharge section) and printed paper is selectively discharged to one of the discharge trays 21. The construction of the device comprising a plurality of discharge trays 21 is known and therefore, drawings of the construction are omitted.

In the cancellation process of this illustrative aspect, the processes shown in FIG. 8 are executed instead of the processes of S306 to S309 of the cancellation process shown in FIG. 5. The same symbols are applied to the processes that are the same as those in FIG. 5. The job receiving process and the printing process are the same as those shown in FIGS. 3 and 4.

If the confirmation instruction is not input in S306 of FIG. 8 (S306:No.), the CPU 11 determines whether a new arriving job is received (S307). If the CPU 11 determines that a new arriving job is not received (S307:No), the process returns to S306. If the CPU 11 determines that a new arriving job is received (S307:Yes), it is determined whether a printing amount of the new arriving job (printing pages or a page amount) is equal to or greater than a reference amount (S401).

If it is determined that the printing amount of the new arriving job is equal to or greater than the reference amount (S401: Yes), the process returns to S306. Therefore, in this case, the status of the new arriving job received in the job receiving process is still the temporally stopping status and the order is not changed.

If it is determined that the printing amount of the new arriving job is less than the reference amount (S401:No), the CPU 11 determines if there is a printed paper where a part of the printing job that is set to be in the stop condition in S304 of FIG. 5 (interrupted printing job) is printed (S402) (the CPU 11 determines whether a part of the printing job that is set to be in the stop condition in S304 of FIG. 5 is already printed on a paper). If the CPU 11 determines that there is no printed paper of the interrupted printing job (S402:No), the status of the new arriving job is changed to the printing execution status in S308 and the order of the new arriving job is changed in S309 and the process returns to S306. Therefore, if the printing amount of the new arriving job is less than the reference amount and there is no printed paper of the printing job that is set to be in the stop condition, printing of the new arriving job is executed.

If it is determined that there is a printed paper where a part of the interrupted printing job is already printed (S402:Yes), the CPU 11 determines whether the discharge tray 21 where the printed paper is discharged is same as the discharge tray 21 where a paper on which the new arriving job is to be printed (the discharge tray 21 designated by the new arriving job) is discharged (S403). If it is determined that the two discharge trays 21 are different (S403:No), the process proceeds to S306 and the status of the new arriving job is changed to the printing execution status. Therefore, printing of the new arriving job is started. If it is determined that the two discharge trays 21 are same (S403:Yes), the process returns to S306. Therefore, in this case, printing of the new arriving job is not started during the instruction waiting period.

According to this illustrative aspect, even if the printing instruction of the new arriving job is received during the instruction waiting period, printing of the new arriving printing job is not started if the printing amount of the new arriving job is equal to or greater than the reference amount. In other words, if printing of the new arriving job which requires a large amount of printing is started during the instruction waiting period, printing of the printing jobs that are not to be deleted is executed after printing of the new arriving job which requires a large amount of printing is completed. This causes a problem that a user must wait for a long time. When the confirmation instruction is input, the running printing operation of the new arriving job is interrupted and printing of the printing jobs that are not to be deleted is executed. This causes problems due to the interruption of the printing operation of the printing jobs. According to an example construction of this illustrative aspect, printing is not started when the printing amount of the new arriving job is equal to or greater than the reference amount. This avoids the above-described problems.

In a case that the request instruction for requesting cancellation of a printing job is received and there is a printed paper of the printing job that is in the stop condition (printing of a part of the printing job that is in the stop condition is already executed), even if the printing instruction of the new arriving job is received during the instruction waiting period, printing of the new arriving job is not started. Accordingly, the printed papers of the printing job that is in the stop condition and the printed papers of the new arriving job are not mixed and a user does not mix printed papers of two different printing jobs.

In a case that a plurality of discharge trays 21 where printed papers are discharged are provided and the discharge tray 21 where the printed papers of the printing job that is in the stop condition are discharged is different from the discharge tray 21 where the printed papers of the new arriving job are discharged, printing of the new arriving job is started. In other words, in the case that the discharge destinations of the printed papers of the printing job that is in the stop condition and the printed papers of the new arriving job are different from each other, if printing of the new arriving job is started first, the printed papers of the two kinds of printing jobs are hardly mixed.

The condition such as steps of S401, S402 and S403 for determining whether printing of a new arriving job is started may be modified arbitrarily. For example, steps of S402 and S403 may be omitted and if the printing amount of the new arriving job is less than the reference amount (S401:No), the process proceeds to S308 and printing of the new arriving job is always executed. S403 may be omitted and if there is a printed paper where a part of the interrupted printing job is printed (S402:No), printing of the new arriving job is not executed. Further, S401 may be omitted and when a new arriving job is received (S307:Yes), it may be determined if there is a printed paper where a part of the interrupted printing job is printed in S402.

<Additional Illustrative Aspect>

Figure 9:
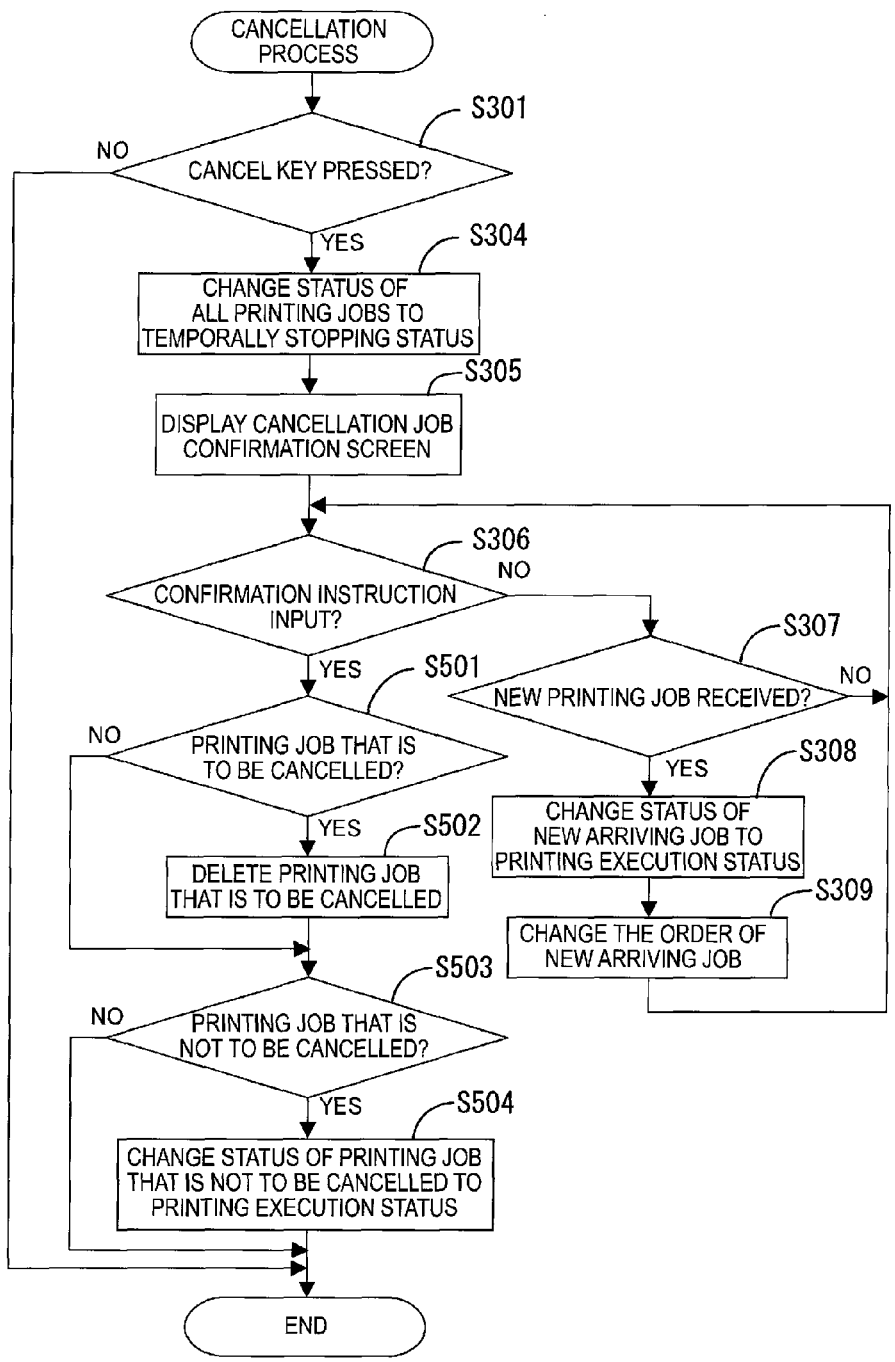
FIG. 9 is a flowchart of a cancellation process according to an additional illustrative aspect.

A further illustrative aspect of the multifunction device will be explained with reference to FIG. 9. FIG. 9 is a flowchart of the cancellation process. In FIG. 9, same symbols are applied to the processes same as those in FIG. 5 and explanation thereof will be omitted.

In the cancellation process shown in FIG. 5, if only one printing job is registered in the printing queue at the time of pressing of the cancel key 23A, the printing job is deleted without input of the confirmation instruction by a user. In the cancellation process according to the further illustrative aspect, a user is required to input the confirmation instruction even if only one printing job is in the printing queue.

In the cancellation process shown in FIG. 9, when the cancel key 23A is pressed (S301:Yes), the CPU 11 changes the status of all the printing jobs registered in the printing queue to the temporally stopping status (S304). Subsequently, a cancellation job confirmation screen is displayed on the display section 22 (S305).

When only one printing job is registered in the printing queue, a message of, for example, "Is the job allowed to be cancelled?" is displayed on the cancellation job confirmation screen with the information of the printing job. If a plurality of printing jobs is registered in the printing queue, the same screen as the cancellation job confirmation screen M1 may be displayed on the display section 22. On the cancellation job confirmation screen, a user inputs the confirmation instruction with using the operating section 23.

By inputting the confirmation instruction, the printing job displayed on the cancellation job confirmation screen is confirmed to be the one that is to be cancelled. If a plurality of printing jobs is in the printing queue, some of the printing jobs may be selected to be cancelled. By inputting the confirmation instruction, the request instruction input by the previous pressing of the cancel key 23A can be cancelled. In other words, in this case, all the printing jobs are confirmed to be not cancelled.

If the confirmation instruction is input on the cancellation job confirmation screen (S306:Yes), the CPU 11 determines whether there is a printing job that is confirmed to be the one that is to be cancelled (S501). If it is determined that there is a printing job that is to be cancelled (S501:Yes), the printing job that is to be cancelled is deleted from the printing queue (S502).

Next, the CPU 11 determines whether there is a printing job confirmed to be the one that is not to be cancelled (S503). If it is determined that there is a printing job confirmed to be the one that is not to be cancelled (S503:Yes), the status of the printing job that is not to be cancelled is changed to the printing execution status (S504). Accordingly, printing of the printing jobs that are not to be cancelled is executed in the printing process.

Then, the CPU 11 terminates the cancellation process.

According to the additional illustrative aspect, the request instruction for requesting cancellation of the printing jobs is cancelled. Therefore, it can handle the case that a user presses the cancel key 23A by mistake.

<Additional Illustrative Aspect>

Figure 10:
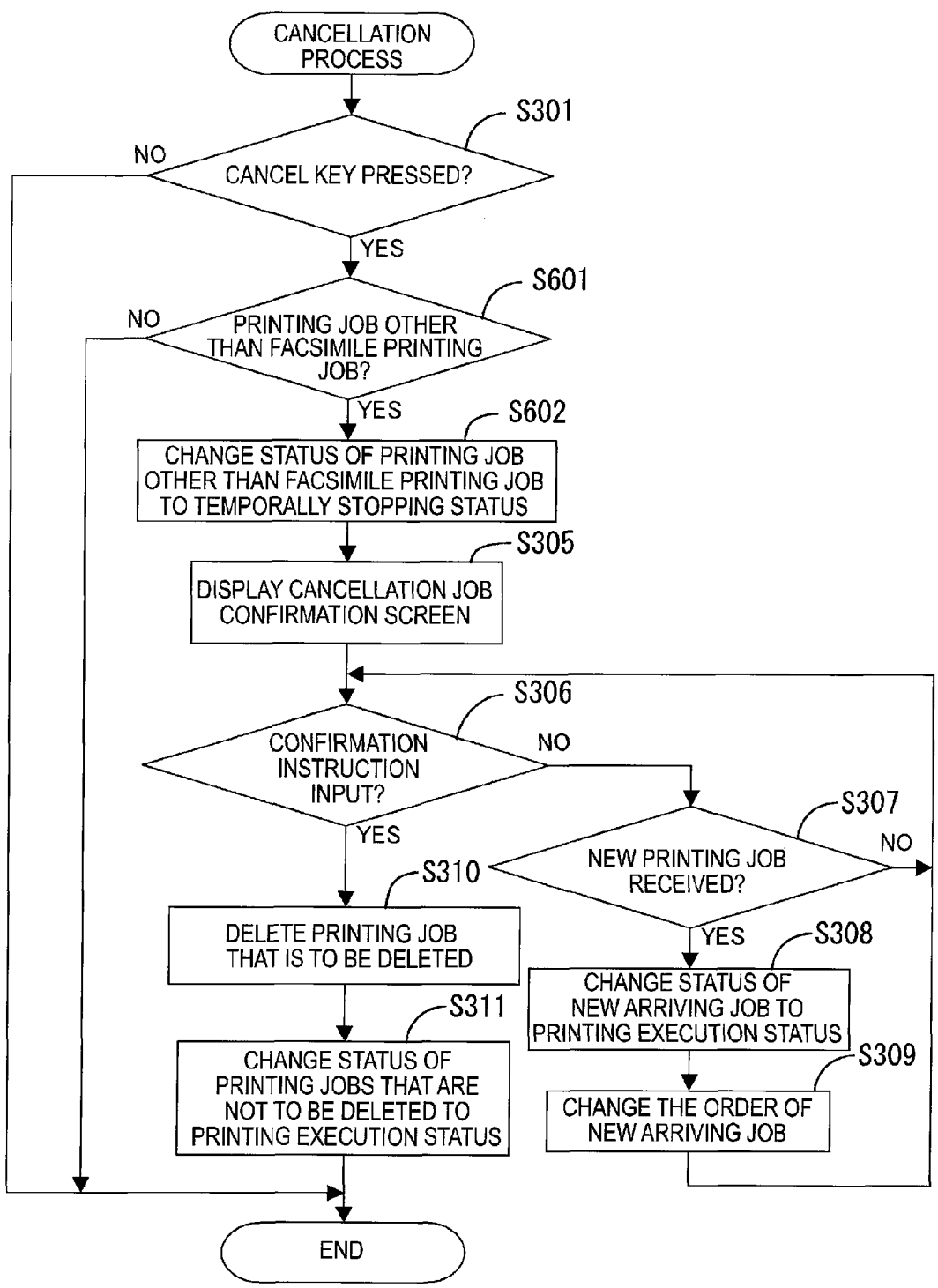
FIG. 10 is a flowchart of a cancellation process according to an additional illustrative aspect.

Next, a further illustrative aspect of the multifunction device will be explained with reference to FIG. 10. FIG. 10 is a flowchart of the cancellation process. In FIG. 10, same symbols are applied to the processes same as those in FIG. 5 and explanation thereof will be omitted.

In the additional illustrative aspect, an independent process is executed for a facsimile printing job in the cancellation process.

If the cancel key 23A is pressed in the cancellation process shown in FIG. 10 (S301:Yes), the CPU 11 determines if there is a printing job other than the facsimile printing job in the printing queue (S601). If it is determined that only facsimile printing jobs are in the printing queue (S601:No), the cancellation process is terminated. In other words, in such a case, printing of the facsimile printing jobs is not stopped. When the cancel key 23A is pressed, a screen for confirming whether the facsimile printing job is cancelled or not may be displayed (without setting the facsimile printing jobs to be in the stop condition), and if an instruction for canceling the facsimile printing job is input by a user, the facsimile printing job may be cancelled.

If it is determined that there is a printing job other than the facsimile printing job in the printing queue (S601:Yes), the status of the printing job other than the facsimile printing job is changed to the temporally stopping status (S602). Therefore, if printing of the facsimile printing job is being executed in the printing process at the time of pressing of the cancel key 23A, printing of the facsimile printing job is continued. If there is a waiting facsimile printing job, printing of other printing job is stopped and printing of a head facsimile printing job is started.

Subsequently, the cancellation job confirmation screen is displayed on the display section 22 (S305) and the CPU 11 waits for input of the confirmation instruction (S306). All the printing jobs other than the facsimile printing jobs are displayed on the cancellation job confirmation screen. A user selects one of the printing jobs as the one that is to be cancelled. A facsimile printing job may be selected as the one that is to be cancelled.

If the CPU 11 receives the confirmation instruction (S306: Yes), the printing job that is to be cancelled is cancelled (S310) and the status of other printing jobs that are not to be cancelled is changed to the printing execution status (S311). Then, the cancellation process is terminated.

According to the additional illustrative aspect, when the request instruction for requesting cancellation of the printing job is received, printing jobs other than facsimile printing jobs that are registered in the printing queue are set to be in the stop condition. In other words, since there is a small possibility that the received facsimile printing job is set to be the one that is to be cancelled, printing of the facsimile printing job is not stopped. This increases user's convenience.

<Additional Illustrative Aspects>

The present invention is not limited to the aspects explained in the above description made with reference to the drawings. The following aspects may be included in the technical scope of the present invention, for example.

(1) The above illustrative aspects show examples where the present invention is applied to a multifunction device having functions of a printer, a copying device, a scanner and a facsimile device. However, the present invention may be applied to a printing device without having any one of the above functions if having at least a printing function.

In the above illustrative aspects, printing of three kinds of printing jobs is executed. However, the present invention may be applied to a device that prints other kinds of printing jobs. For example, in a device having a connecting section where an external storing medium such as a USB memory is connected, the present invention may be applied to the device that executes direct printing of a printing job. In the direct printing, data read from the external storing medium is printed in the printing process.

(2) In the above illustrative aspects, the request instruction for requesting cancellation of a printing job is input by pressing the cancel key provided on the device. For example, in a device comprising a touch panel as an operating portion, a cancel key displayed on the touch panel may be operated to input the request instruction.

Further, for example, the CPU 11 of the multifunction device 10 may send a signal to a computer 30 so as to display on a display of the computer 30 screen showing content in the printing queue or a screen corresponding to the cancellation job confirmation screen. For example, the screen may be displayed on a web page in a Web browser.

Further, a user may send instructions such as a request instruction or a confirmation instruction with using an operating section of the computer 30 according to a program (a printer driver, a Web browser and other programs) executed by the CPU of the computer 30. The CPU 11 of the multifunction device 10 may receive the instructions via the network interface 15.

(3) The above illustrative aspects may be combined to each other arbitrarily or may be partially modified. For example, each condition of another illustrative aspect (FIG. 8) (S401, S402, S403) for determining whether printing of a new arriving job is started may be added to the additional illustrative aspect (FIG. 9) or the additional illustrative aspect (FIG. 10).

What is claimed is:

1. A printing device comprising:
    a job receiving device configured to receive a printing instruction of a printing job;
    a printing device configured to print the printing job;
    a control device:
    memory having computer executable instructions stored thereon that, when executed by the control device, cause the printing device to:
        register the printing job in a queue if the job receiving device receives the printing instruction;
        control the printing device to print the printing job registered in the queue sequentially;
        receive a cancellation request instruction for requesting cancellation of the printing job registered in the queue;
        receive a confirmation instruction for confirming each printing job to be cancelled or not to be cancelled;

set the printing job registered in the queue to be in a stop condition, if the cancellation request instruction is received;

delete from the queue the printing job that is in the stop condition if the confirmation instruction is received for the printing job that is in the stop condition;

determine whether the job receiving device receives a new printing job during an instruction waiting period from a time when receiving the cancellation request instruction to a time when receiving the confirmation instruction; and control the printing device to print the new printing job prior to completion of printing of the printing job registered in the queue, if the job receiving device receives the new printing job during the instruction waiting period.

2. The printing device as in claim 1, wherein the control device is configured further to:

determine whether a printing amount of the new printing job is equal to or greater than a reference amount; and control the printing device not to print the new printing job if the printing amount is determined to be equal to or greater than the reference amount and to print the new printing job if the printing amount is determined to be less than the reference amount.

3. The printing device as in claim 1, wherein the computer executable instructions, when executed by the control device, further cause the printing device to:

determine whether a part of the printing job that is in the stop condition has been printed on a recording medium if the cancellation request instruction is received; and control the printing device not to print the new printing job if the part of the printing job that is in the stop condition is determined to be printed on the recording medium and to print the new printing job if the part of the printing job that is in the stop condition is determined not to be printed on the recording medium.

4. The printing device as in claim 3, further comprising:

a discharge device configured to discharge a recording medium on which the printing job has been printed by the printing device;

a plurality of receiving devices configured to receive discharged recording media on which the printing job has been printed by the printing device, wherein the computer executable instructions, when executed by the control device, further cause the printing device to:

determine whether the recording medium on which the printing job that is in the stop condition has been printed has been discharged to one of the receiving devices that is different from another one of the receiving devices to which the recording medium on which the new printing job is to be printed is to be discharged; and control the printing device to print the new printing job if determining that the recording medium on which the printing job that is in the stop condition has been printed has been discharged to one of the receiving devices that is different from another one of the receiving devices to which the recording medium on which the new printing job to be printed is to be discharged.

5. The printing device as in claim 1, wherein if the confirmation instruction is received during execution of printing of the new printing job, the computer executable instructions, when executed by the control device, further cause the printing device to control the printing device to print a printing job that is registered in the queue and determined not to be cancelled after completion of printing of the new printing job.

6. A printing device comprising:

a job receiving device configured to receive a printing instruction of a printing job of a plurality of types including a facsimile printing job for printing facsimile data and a non-facsimile printing job for printing data other than facsimile data;

a printing device configured to print the printing job;

a control device; and memory having computer executable instructions stored thereon that, when executed by the control device, cause the printing device to:

register the printing job in a queue if the job receiving device receives the printing instruction;

control the printing device to print the printing job registered in the queue sequentially;

receive a cancellation request instruction for requesting cancellation of the printing job registered in the queue;

receive a confirmation instruction for confirming each printing job to be cancelled or not to be cancelled;

set the printing job other than the facsimile printing job registered in the queue to be in a stop condition, if the cancellation request instruction is received;

delete from the queue the printing job that is in the stop condition if the confirmation instruction for the printing job that is in the stop condition is received;

determine whether the job receiving device receives a new printing job during an instruction waiting period from a time when receiving the cancellation request instruction to a time when receiving the confirmation instruction; and if no facsimile printing job is registered in the queue, control the printing device to print the new printing job prior to completion of printing of the printing job registered in the queue, if the job receiving device receives the new printing job during the instruction waiting period.

7. The printing device as in claim 6, wherein the computer executable instructions, when executed by the control device, further cause the printing device to:

determine whether a printing amount of the new printing job is equal to or greater than a reference amount; and control the printing device not to print the new printing job if the printing amount is determined to be equal to or greater than the reference amount and to print the new printing job if the printing amount is determined to be less than the reference amount.

8. The printing device as in claim 6, wherein the computer executable instructions, when executed by the control device, further cause the printing device to:

determine whether a part of the printing job that is in the stop condition is printed on a recording medium if the cancellation request instruction is received; and control the printing device not to print the new printing job if the part of the printing job that is in the stop condition is determined to be printed on the recording medium and to print the new printing job if the part of the printing job that is in the stop condition is determined not to be printed on the recording medium.

9. The printing device as in claim 8, further comprising:

a discharge device configured to discharge a recording medium on which the printing job has been printed by the printing device;

a plurality of receiving devices configured to receive discharged recording media, wherein the computer executable instructions, when executed by the control device, further cause the printing device to:

determine whether the recording medium on which the printing job that is in the stop condition has been printed has been discharged to one of the receiving devices that is different from another one of the receiving devices to which the recording medium on which the new printing job is to be printed is to be discharged; and control the printing device to print the new printing job if determining that the recording medium on which the printing job that is in the stop condition has been printed has been discharged to one of the receiving devices that is different from another one of the receiving devices to which the recording medium on which the new printing job to be printed is to be discharged.

10. The printing device as in claim 6, wherein if the confirmation instruction is received during execution of printing of the new printing job, the computer executable instructions, when executed by the control device, further cause the printing device to control the printing device to print a printing job that is registered in the queue and determined not to be cancelled after completion of printing of the new printing job.

11. A printing device comprising:
a job receiving device configured to receive a printing instruction of a printing job;
a printing device configured to print the printing job;
a control device; and
memory having computer executable instructions stored thereon that, when executed by the control device, cause the printing device to:
register the printing job in a queue if the job receiving device receives the printing instruction;
control the printing device to print the printing job registered in the queue sequentially;
determine whether a cancellation request instruction for requesting cancellation of the printing job registered in the queue has been received;
determine whether a confirmation instruction for confirming each printing job to be cancelled or not to be cancelled has been received;
set the printing job registered in the queue to be in a stop condition, if the cancellation request instruction is received;
delete from the queue the printing job that is in the stop condition if the confirmation instruction is determined to be received for the printing job that is in the stop condition; and
determine whether the job receiving device receives a new printing job if the cancellation request instruction is determined to be received and the confirmation instruction is determined not be received; and
control the printing device to print the new printing job prior to completion of printing of the printing job registered in the queue, if the cancellation request instruction is determined to be received, the confirmation instruction is determined not to be received, and the job receiving device has received the new printing job.

12. The printing device as in claim 11, wherein the control device is configured further to:
determine whether a printing amount of the new printing job is equal to or greater than a reference amount; and
control the printing device not to print the new printing job if determining that the printing amount is equal to or greater than the reference amount and to print the new printing job if determining that the printing amount is less than the reference amount.

13. The printing device as in claim 11, wherein the computer executable instructions, when executed by the control device, further cause the printing device to:
determine whether a part of the printing job that is in the stop condition is printed on a recording medium if the cancellation request instruction is received; and
control the printing device not to print the new printing job if the part of the printing job that is in the stop condition is determined to be printed on the recording medium and to print the new printing job if the part of the printing job that is in the stop condition is determined not to be printed on the recording medium.

14. The printing device as in claim 13, further comprising:
a discharge device configured to discharge a recording medium on which the printing job has been printed by the printing device;
a plurality of receiving devices configured to receive discharged recording media, wherein the computer executable instructions, when executed by the control device, further cause the printing device to:
determine whether the recording medium on which the printing job that is in the stop condition has been printed has been discharged to one of the receiving devices that is different from another one of the receiving devices to which the recording medium on which the new printing job is to be printed is to be discharged; and
control the printing device to print the new printing job if the recording medium on which the printing job that is in the stop condition has been printed has been discharged to one of the receiving devices that is different from another one of the receiving devices to which the recording medium on which the new printing job to be printed is to be discharged.

15. The printing device as in claim 11, wherein if the confirmation instruction is received during execution of printing of the new printing job, the computer executable instructions, when executed by the control device, further cause the printing device to control the printing device to print a printing job that is registered in the queue and determined not to be cancelled after completion of printing of the new printing job.

* * * * *